June 1, 1943. F. A. GRUETJEN 2,320,589
PACKING ASSEMBLY
Filed April 28, 1941
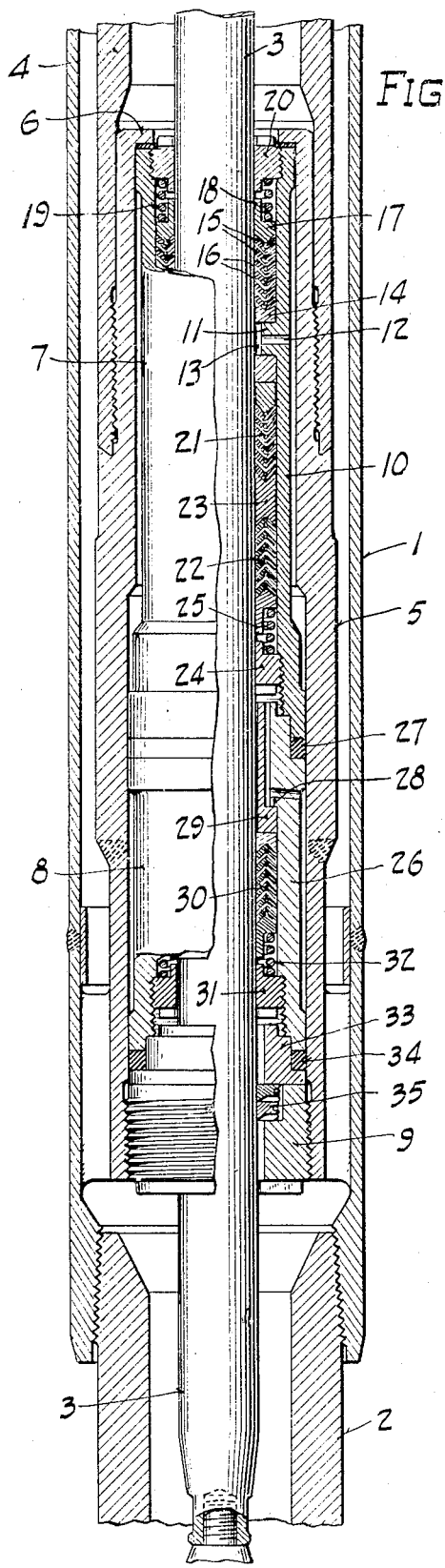
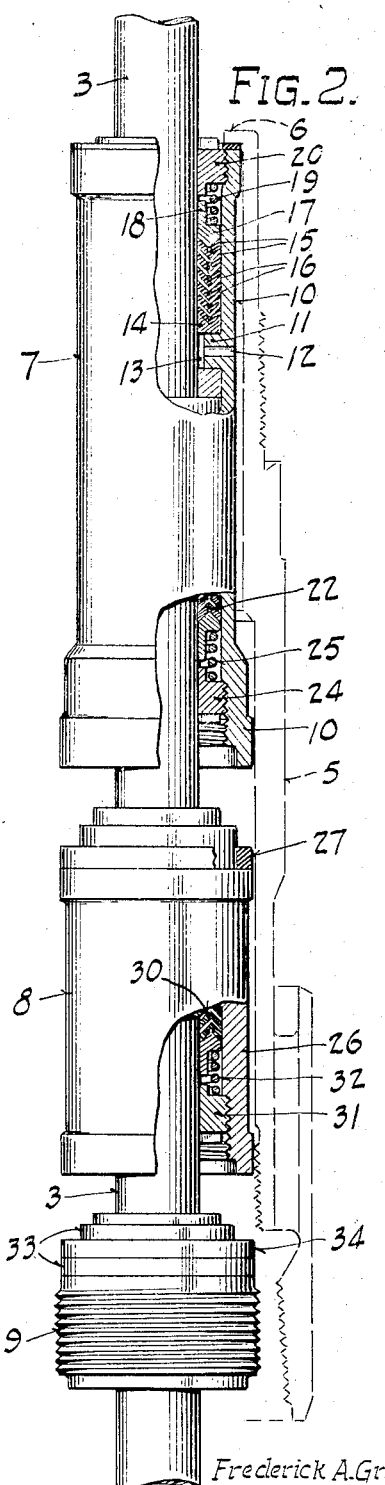
Frederick A. Gruetjen
INVENTOR.
BY
ATTORNEY.

Patented June 1, 1943

2,320,589

UNITED STATES PATENT OFFICE 2,320,589

PACKING ASSEMBLY

Frederick A. Gruetjen, Milwaukee, Wis., assignor to A. O. Smith Corporation, Milwaukee, Wis., a corporation of New York Application April 28, 1941, Serial No. 390,783

2 Claims. (Cl. 286—27)

This invention relates to a packing assembly adapted for use on long reciprocating members such as piston rods for oil well pumps.

Heretofore it has been the practice to use various types of packing mounted either on the piston rod or in the tubular head surrounding it. With the advent of the fluid driven pump at the bottom of the well, in place of the sucker rod type of pump, new problems arose as to packing the piston against leakage of crude oil from the pump chamber into the cylinder of the fluid motor and against leakage of clean power fluid from the motor. It was necessary to provide packings in groups some of which might be spaced apart to provide for bleeding of leakage fluid, as set forth in the two co-pending applications Serial Nos. 390,781 and 390,782, filed on April 28, 1941, by the present inventor.

The object of the present invention is to provide a more simple and less costly assembly structure for the packings.

In accordance with the invention one or more separate groups of packing are assembled in what may be termed a cartridge which is removably secured in place in the pump housing intermediate the pump and the fluid motor.

The ease with which the packings can be assembled and disassembled in the structure is a great advantage. However, further advantage is obtained in the holding of the various packing members clamped in separate groups instead of being assembled and clamped as a whole.

An embodiment of the invention is illustrated in the accompanying drawing in which Figure 1 is a longitudinal central section of that part of a pumping unit containing the packing; and Fig. 2 is an elevational view, partly in section, of the several completed packing cartridges positioned upon the piston rod ready for assembly.

The unit has an outer cylindrical casing 1 to the lower end of which the pump cylinder 2 is threaded. The piston rod 3 extends axially of the casing and carries the usual plunger in the pump cylinder.

The upper end of the piston rod 3 is secured to a piston, not shown, operating in the motor cylinder 4 secured inside of casing 1. The lower end of the cylinder 4 carries the tubular housing 5 for the packing units, the housing being threaded to the end of the cylinder so that the entire packing assembly may be assembled as a unit.

The upper end of the housing 5 has an inturned flange 6 against which the packing cartridge 7 with a suitable sealing gasket is held by upward pressure from packing cartridge 8, which in turn is held in place by the retaining plug 9 threaded into the lower end of the housing 5.

The cartridge 7 comprises a container sleeve 10 generally spaced radially from housing 5, but fitting snugly therein at the ends of the sleeve. The sleeve has a central circumferential inner flange 11 containing a bleeder opening 12 connecting with a space 13 around the piston rod 3 and the radial space between the sleeve 10 and housing 5, as more clearly set forth in the copending applications above referred to. The flange 11 provides a stop against which two separate groups of packings are assembled from opposite ends of the sleeve 10.

The upper group of packings comprises an inside packing adapter ring 14 resting on flange 11 and supporting alternate chevron type packing rings 15 and spacer rings 16. On top of the upper packing ring 15 is an outside packing spring adapter 17 having an inner skirt 18 providing an outer radial space for receiving a coil spring 19 for maintaining a constant pressure upon the several packing elements. A small retaining plug 20 is threaded into the outer end of sleeve 10 for holding the spring 19 and other parts in place. The packing rings 15 bear against the rod 3 at an angle to provide a scraping action as the rod moves downwardly.

There are preferably two similar groups of packings 21 and 22 disposed below the flange 11 and separated by an intermediate packing adapter 23. The upper group 21 has its packing rings bearing against the rod 3 at the same angle as the rings 15 while group 22 has its packing rings reversed in direction to scrape the rod as the latter moves upwardly. A plug 24 threaded into the lower end of the sleeve 10 holds the coil spring 25 against the end of packing group 22.

The cartridge 8 comprises a sleeve 26 fitting at its ends in the housing 5 while preferably spaced radially from it in the main central portion. The sleeve 26 engages a packing ring 27 between the upper end of the sleeve and the lower end of sleeve 10. The upper end of the sleeve 26 also engages a shoulder in the sleeve 10 to limit compression of the packing 27.

The sleeve 26 has an inner shoulder 28 against which a bushing 29 is held by the packing group assembly 30 composed of adapter rings and alternate packing and spacer rings as previously described for the other groups of packing. The packing rings of group 30 are arranged to scrape the rod 3 upon an upward movement of the rod. A retaining plug 31 is threaded into the end of sleeve 26 and serves to hold the coil spring 32 against the packing group 30. The sleeve 26 has a bleeder passage similar to the passage 12 in sleeve 10 to withdraw any leakage fluid between the two lower sets of packing.

A packing gland 33 engages a packing ring 34 between it and the lower end of sleeve 26 and has a shoulder engaging the end of the sleeve to limit compression of packing 34.

The cartridges 7 and 8 are held in place in housing 5 by the retaining plug 9 as previously described, which bears against packing gland 33. The plug 9 has a recess in its inner surface for receiving sand scraper rings 35 which serve to prevent sand and grit from being carried upwardly from the crude oil pump by the piston rod 3.

The threads on the lower ends of sleeves 10 and 26 are considerably longer than would be necessary to receive the plugs 24 and 33, respectively, to provide for threading into the end of the sleeve a suitable pulling tool for pulling the sleeve from housing 5.

The packings 27 and 34 are preferably made of rubber of predetermined volume so that when the upper end of sleeve 26 engages the shoulder on sleeve 10 and also when the packing gland 33 engages the shoulder on sleeve 8, the respective packings 27 and 34 will be compressed sufficiently to force them outwardly into the crevices between the respective confining elements and the housing 5.

In assembling the structure the several groups of packing are preferably assembled in the respective cartridges prior to insertion in the housing 5 and prior to the insertion of piston rod 3. However, the several cartridges may be assembled on the piston rod 3 and then the housing 5 slipped over the same.

The specific construction of the groups of packing and of the sand scrapers may be somewhat dependent upon conditions to be encountered and the design of the pump. As shown there are four groups of packings, the center two groups being disposed back to back in a single unit. Different numbers of groups may be employed.

The invention provides relatively short sleeves for containing the several groups of packing, making for ease of assembly. The pressure on the several groups can be independently adjusted and the several sleeves are held in place without affecting the pressure on the packing rings.

The invention may have various embodiments within the scope of the accompanying claims.

I claim:

1. In combination in a substantially cylindrical packing housing surrounding a piston rod disposed for reciprocation axially thereof, a cylindrical sleeve disposed in said housing and secured against axial movement relative to said housing, said sleeve being radially spaced from said housing with said space substantially closed at its ends to provide a chamber for receiving leakage fluid, a central circumferential flange extending inwardly toward the piston rod, said flange being spaced from the piston rod and having a bleeder passage connecting the space with said receiving chamber, separate sets of packing inserted from opposite ends of said sleeve and held against said flange, and means secured to the opposite ends of said sleeve for independently holding said sets of packing in place under predetermined compression.

2. In combination with a cylindrical packing housing surrounding a reciprocating rod and having an inturned flange, a cylindrical sleeve disposed in said housing and having its inner end engaging said flange with a sealing member therebetween, a packing element within said sleeve and engaging said reciprocating rod, a sealing ring between the outer end of said sleeve and the inner wall of the housing, and a plug secured in the end of the housing for pressing said sleeve against said first named sealing member and for compressing said sealing ring, said sleeve being radially spaced from said housing in the central portion of the sleeve to provide a fluid chamber which is sealed at its respective ends.

FREDERICK A. GRUETJEN.